Jan. 4, 1949.
J. M. HINDS
2,458,268
FORCED CIRCULATION ELECTRICALLY
HEATED SPACE HEATER
Filed Feb. 5, 1946
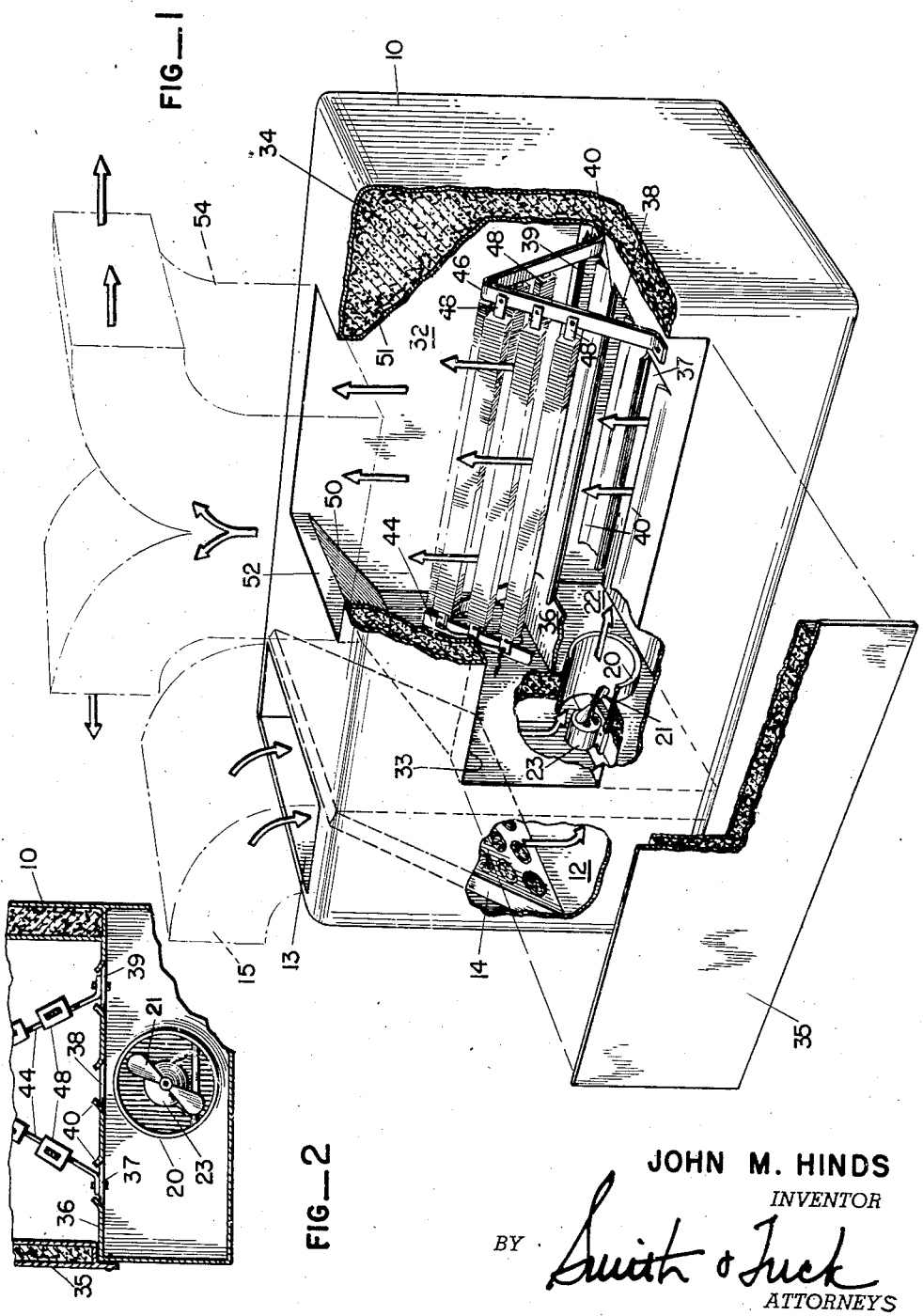
JOHN M. HINDS
INVENTOR
BY *Smith & Tuck*
ATTORNEYS Patented Jan. 4, 1949

2,458,268

UNITED STATES PATENT OFFICE 2,458,268

FORCED CIRCULATION ELECTRICALLY HEATED SPACE HEATER

John M. Hinds, Seattle, Wash., assignor to Northeast Electric & Engineering, Seattle, Wash.

Application February 5, 1946, Serial No. 645,512

4 Claims. (Cl. 219—39)

This invention relates to a space heater and, more particularly, to a heat transfer mechanism, suitable for small buildings and the like.

It is an important object of my invention to provide a heat transfer mechanism which is simple to construct and easy to operate and capable of mass production, requiring but a minimum of skilled labor for proper installation.

Another object of my invention is the provision of a space heater in which electrical energy may be efficiently and economically employed for heating large volumes of air.

A still further object of my invention resides in the provision in a space heater of a chamber in which the heat transfer takes place, and which chamber may be suitably insulated from other appurtenant chambers with but a minimum of materials and labor.

The foregoing objects and others ancillary thereto I prefer to accomplish as follows. According to a preferred embodiment of my invention, I form a right angular cabinet, enclosing a filter chamber, a mixing chamber and a transfer chamber. In the filter chamber is placed a unit to remove solid bodies from the air. In the mixing chamber entering air from the filtering unit is intermixed with air subjected to latent heat escaping from the heater chamber, in order that the greater percentage of the latter is used and prevented from wasteful escape. In the heater chamber the actual transfer of radiant energy derived from the electrical source is made to the air passing through the transfer chamber from the mixing chamber. Between the filter chamber and the mixing chamber is air conduit means and normally means is included for inducing a draft through this conduit means. The mixing chamber is disposed below the transfer chamber and is separated therefrom by a relatively thin deck that is slotted to provide air passages. In a certain form of the invention, the upper surface of the deck is flanged along the edges of the slots to assist in effecting a lock or blocking of the air from the transfer chamber downward.

In the transfer chamber is a plurality of electric heater bars arranged preferably in alignment with the slots in the deck therebelow and disposed in a prismatic form, in order to efficiently give off their heat to air passing thereover.

The upper portion of the transfer chamber has a reduced cross-section in at least two dimensions and, preferably, converges longitudinally of both the slots in the deck and the elongated heater bars. An air inlet opening is provided to the filter chamber and from the transfer chamber is an outlet opening in which a distribution register may be placed, or to which may be fitted a distribution conduit.

The novel features that I consider characteristic of my invention are set forth with particularity in the appended claims. The invention itself, however, both as to its organization and its method of operation, together with additional objects and advantages thereof, may best be understood from the following description of a specific embodiment when read in connection with the accompanying drawings, in which:

Fig. 1 is a perspective view of a space heater with portions broken away and shown in section for convenience of illustration, and Fig. 2 is a lateral cross section through the fragment of the cabinet showing the deck dividing the mixing and transfer chambers.

A preferred embodiment of my invention, referring to the drawings, is constituted by a casing in which is formed a plurality of chambers adapted to receive and contain the various functioning elements necessary for operation of the device. The casing 10 has at one end the upright filter chamber 12, to which air is conducted through the opening 13 in its upper end. Chamber 12 is relatively thin and tall and extends from the top to the bottom of the cabinet or casing. Disposed angularly across chamber 12 is the filter unit 14, which may be of the conventional framed saturated wool type. Air, conducted to the opening 13 by the return conduit 15, travels downward through chamber 12, passing through the interstices of the filter 14.

In the bottom of cabinet 10, at right angles to and lying adjacent chamber 12, is the mixing chamber 22. Between chamber 12 and chamber 22 is an elongated thimble 20, forming an air conduit and laying with its axis substantially horizontal. In the filter chamber end of the conduit 20 is a fan 21 which is operated by an electric motor 23 to facilitate inducing the travel of air downward through chamber 12 and filter 14 and outward therefrom into chamber 22.

Above chamber 22 in the cabinet 10 is the transfer chamber 32, generally rectangular in shape similar to that of chamber 22 and lying above said chamber as well as to the side of the upper portion of chamber 12. In distinction to the filter and mixing chambers, the means forming this transfer chamber is double wall structure, usually of sheet metal, having placed therebetween insulating means 34. In a side wall of chamber 32 is an opening 33 which is closed by a flanged insulated closure block 35 shown in the drawing as displaced outward from its normal position for convenience of illustration. Chambers 12 and 22 are satisfactorily formed of single wall sheet metal construction, since the air passing therethrough is of relatively low temperature and there is no necessity to highly insulate the same.

Chambers 22 and 32 are separated from each other by a substantially horizontal deck 36, provided with longitudinally extending slots 37, 38 and 39, lying adjacent each other. Deck 36 has upstanding along the edges of the slots 37, 38, 39, flanges 40, which give dimension to the air passages formed by the slots and further serve to block and trap any air that may tend to escape downward from the transfer chamber to the mixing chamber.

Upstanding on each end of the deck adjacent the ends of the air passage slots and in opposition to each other is a pair of inverted V-frames 44 and 46, which serve to support a plurality of elongated electrical bar heaters 48, to which the electric current is supplied in a suitable manner through conventional conductor wires.

As can be seen in Fig. 1, the upper area of chamber 32 reduces in cross-section longitudinally of the longest dimension of the chamber. This is accomplished by providing the sloping walls 50, 51, which converge toward each other and toward the discharge opening 52 in the upper face of casing 10. As air passes from chamber 22, through the slots of the deck and over the heater bars 48, it is forced to compact itself and to thereby increase in pressure just prior to its departure from the casing through opening 52 and into the distribution header suggested at 54. The distribution header in this instance is shown as of the divided type, and it is usual in installing a space heater of the type described to include in the header 54 a stack switch which responds to the heat of air rising into the header in the control of the system.

While I have shown and described particular embodiments of my invention, it will occur to those skilled in the art that various changes and modifications may be made without departing from the invention, and I therefore aim in the appended claims to cover all such changes and modifications as fall within the true spirit and scope of my invention.

Having thus described my invention, I claim:

1. A heat-transfer mechanism, comprising: a sheet metal deck having upwardly flanged slots, means forming an adit chamber below said deck, means forming a heater chamber above said deck, prismatically arranged elongated electric heater bars in said chamber above the deck in alignment with the longitudinal axis of the slots, means forming a filter chamber adjacent and juxtaposed to said adit and heater chambers, an elongated horizontal thimble between said filter and adit chambers forming an air conduit, means to conduct air downward to said filter chamber, and means to conduct air upward and away from said heater chamber, said heater chamber having a reduced horizontal cross-section from below upward.

2. A heat-transfer mechanism, comprising: a slotted deck, means forming an adit chamber below said deck, means forming a heater chamber above said deck, a plurality of parallel elongated electric heater bars horizontally disposed in said chamber above the slotted deck in prismatic arrangement, means forming a filter chamber adjacent and juxtaposed to said adit and heater chambers, means forming a horizontal air flue between said filter and adit chambers forming an air conduit, means to conduct air downward to said filter chamber, and means to conduct air upward and away from said heater chamber, said heater chamber having a reduced horizontal cross section from below upward and converging longitudinally of said heater bars.

3. A heat-transfer mechanism, comprising: a slotted deck, upwardly directed flanges on the edges of said slots of the deck, means forming an adit chamber below said deck, means forming a heater chamber above said deck, elongated electric heater elements in said chamber above the deck and aligned with said slots, means forming a filter chamber adjacent and juxtaposed to said adit and heater chambers, an elongated horizontal thimble between said filter and adit chambers forming an air conduit, means to conduct air downward to said filter chamber, and means to conduct air upward and away from said heater chamber, said heater chamber having a reduced horizontal cross-section from below upward.

4. A heat-transfer mechanism, comprising: a slotted deck, means forming a mixing chamber below said deck, means forming a heater chamber above said deck and aligned with said slots, elongated electric heater elements in said chamber above the deck, means forming a filter chamber adjacent and juxtaposed to said mixing and heater chambers, an elongated horizontal thimble between said filter and mixing chambers forming an air conduit, a fan adjacent the filter chamber end of said thimble, means to conduct air downward to said filter chamber, and means to conduct air upward and away from said heater chamber, said heater chamber having a reduced horizontal cross-section from below upward.

JOHN M. HINDS.

REFERENCES CITED

The following references are of record in the file of this patent:

UNITED STATES PATENTS

| Number | Name | Date |
| --- | --- | --- |
| 1,054,409 | Harrison et al. | Feb. 25, 1913 |
| 1,358,059 | Clutts | Nov. 9, 1920 |
| 1,644,595 | Karg | Oct. 4, 1927 |
| 1,829,765 | Spalding | Nov. 3, 1931 |
| 1,869,623 | Rubini et al. | Aug. 2, 1932 |
| 2,248,959 | Christman et al. | July 15, 1941 |